United States Patent
Ballapuram et al.

(10) Patent No.: US 11,720,258 B2
(45) Date of Patent: Aug. 8, 2023

(54) MEMORY BYPASS FOR ERROR DETECTION AND CORRECTION

(71) Applicant: Micron Technology, Inc., Boise, ID (US)

(72) Inventors: Chinnakrishnan Ballapuram, San Jose, CA (US); Saira S. Malik, Lafayette, IN (US); Taeksang Song, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 120 days.

(21) Appl. No.: 17/349,626

(22) Filed: Jun. 16, 2021

(65) Prior Publication Data

US 2022/0004324 A1 Jan. 6, 2022

Related U.S. Application Data

(60) Provisional application No. 63/046,876, filed on Jul. 1, 2020.

(51) Int. Cl.
*G06F 3/06* (2006.01)

(52) U.S. Cl.
CPC .......... *G06F 3/0619* (2013.01); *G06F 3/0655* (2013.01); *G06F 3/0673* (2013.01)

(58) Field of Classification Search
CPC .... G06F 3/0619; G06F 3/0655; G06F 3/0673; G06F 3/0659; G06F 3/0688; G06F 11/1052; G11C 29/18; G11C 29/42; G11C 29/44

See application file for complete search history.

(56) References Cited

U.S. PATENT DOCUMENTS

| | | | | |
|---|---|---|---|---|
| 7,725,556 | B1* | 5/2010 | Schlansker | G06F 13/385 |
| | | | | 709/212 |
| 9,191,030 | B2* | 11/2015 | Sakata | H03M 13/29 |
| 10,049,427 | B1* | 8/2018 | Lachowsky | H04N 19/91 |
| 11,011,215 | B1* | 5/2021 | Parry | G11C 11/4076 |
| 11,449,232 | B1* | 9/2022 | Kannan | G06F 3/0679 |
| 2017/0110169 | A1* | 4/2017 | Kim | G06F 13/1689 |
| 2018/0088848 | A1* | 3/2018 | Lee | G06F 13/4282 |
| 2019/0347043 | A1* | 11/2019 | Hasbun | G06F 3/0679 |
| 2021/0049068 | A1* | 2/2021 | Schaefer | G06F 11/1076 |
| 2022/0004324 | A1* | 1/2022 | Ballapuram | G06F 3/0659 |

* cited by examiner

*Primary Examiner* — Sean D Rossiter
(74) *Attorney, Agent, or Firm* — Holland & Hart LLP

(57) ABSTRACT

Methods, systems, and devices for compressed logical-to-physical mapping for a memory bypass for error detection and correction are described. A memory device may include error detection and correction circuitry for detecting and correcting errors in data that is read from a memory array of the memory device. To reduce read latencies, the memory device may include bypass circuitry that enables it to transmit the data to the host device before or during error detection. If the memory device determines that the data is erroneous, the memory device may transmit an alert to the host device concurrently with or after transmitting the data. The memory device may perform error correction on the data and store corrected data in a register. Based on receiving an alert, the host device may issue one or more additional read commands to re-read the data from the memory bank or read the corrected data from the register.

24 Claims, 7 Drawing Sheets

MEMORY BYPASS FOR ERROR DETECTION AND CORRECTION

CROSS REFERENCE

The present application for patent claims the benefit of U.S. Provisional Patent Application No. 63/046,876 by BALLAPURAM et al., entitled "MEMORY BYPASS FOR ERROR DETECTION AND CORRECTION," filed Jul. 1, 2020, assigned to the assignee hereof, and expressly incorporated by reference herein.

BACKGROUND

The following relates generally to one or more systems and more specifically to a memory bypass for error detection and correction.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory devices, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
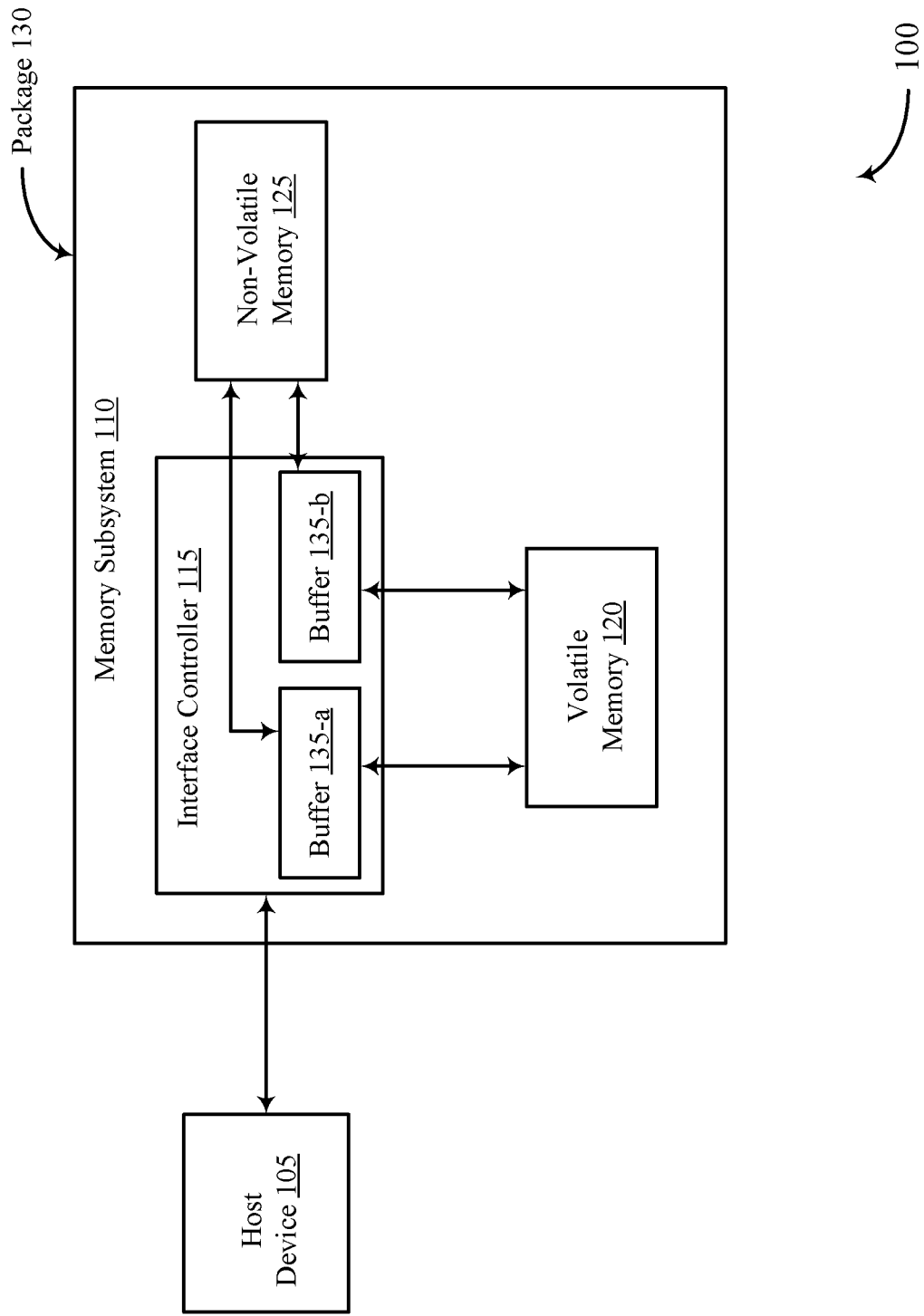
FIG. 1 shows a diagram of a system including a memory subsystem that supports a memory bypass for error detection and correction in accordance with examples of the present disclosure.

Some memory devices may include on-die error detection and correction to reduce the bit error rate associated with reading data from memory, among other aspects. For example, a memory device may include error-correcting code (ECC) memory that has error detection and correction circuitry in the return data path for detecting and correcting data errors before the data is transmitted to, for example, a host device. Such error detection and correction functionality may improve the bit error rate of the memory device but may add undesirable latency to read operations, including read operations for which the data is determined not to have any errors. That is, the latency associated with error detection and correction may be a fixed overhead that is incurred for every read operation regardless of whether there were any errors. In some cases, the majority of the latency introduced by error detection and correction is incurred during the error correction process rather than during the error detection process.

As described herein, to reduce the latency associated with error detection and correction while maintaining a similar bit error rate, a memory device may include ECC bypass circuitry that enables the memory device to transmit the data to the host device in parallel with performing error detection on the data, rather than waiting to send the data to the host device until after the error detection and error correction have been completed. If the error detection procedure determines that the data is erroneous, the memory device may transmit an indication, such as an alert, to the host device to notify the host that the data it has received (or is currently receiving) is erroneous. The host device may then re-request the data from the memory device.

To implement this functionality, a memory device may read the data from a memory array and provide the same data to both a data bus for transmission to the host device and to an error detection component for determining whether the data is erroneous. If the error detection component determines that the data is erroneous, the memory device may transmit an indication, such as an alert, to the host device to notify the host device that the data received by the host device is erroneous. Because the error detection process may be performed relatively quickly (e.g., with low latency), the memory device may be configured to transmit the indication, such as the alert, and the data concurrently (e.g., in parallel using different communication paths, at least partially overlapping in time). Thus, the host device may receive the data and the alert (if present) at substantially the same time or at least partially overlapping in time.

If the error detection procedure determines that the data is erroneous, the memory device may perform an error correction procedure on the data to generate corrected data, and may store the corrected data in a register configured to store the corrected data. The host device may, in response to receiving an indication, such as an alert, indicating that the data it has received is erroneous, issue a read command to the memory device to read the corrected data from the register or to re-read the data from the memory array. In some examples, the host device may use a different read command for reading the corrected data from the register than a read command used for reading the data from the memory array.

The techniques described herein may provide even more robust error detection and correction functionality while reducing read latencies and without significantly increasing the complexity of the memory controller. Moreover, because the existing path through the error detection and correction circuitry may remain intact, the memory device may be configurable (e.g., via a mode register) to selectively disable the ECC bypass such that the memory device performs error detection and correction on the data before it is transmitted to the host device. Disabling the ECC bypass may be useful for applications where the bit error rate is relatively high, for example.

Features of the disclosure are initially described in the context of a system and subsystem as described with reference to FIGS. 1 through 3. Features of the disclosure are described in the context of timing diagrams as described with reference to FIGS. 4 and 5. These and other features of the disclosure are further illustrated by and described with reference to an apparatus diagram and one or more flowcharts that relate to a memory bypass for error detection and correction as described with reference to FIGS. 6 and 7.

FIG. 1 illustrates an example of a system 100 that supports a memory bypass for error detection and correction in accordance with examples as disclosed herein. The system 100 may be included in an electronic device such a computer or phone. The system 100 may include a host device 105 and a memory subsystem 110. The host device 105 may be a processor or system-on-a-chip (SoC) that interfaces with the interface controller 115 (e.g., a control component) as well as other components of the electronic device that includes the system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the system 100 may be capable of machine-type communication (MTC), machine-to-machine (M2M) communication, or device-to-device (D2D) communication. In some examples, the device associated with the system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64B) or 128 bytes (128B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more suboperations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120.

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-*a* (e.g., in response to determining that one of the n sets of volatile memory cells stores the requested data) so that it can be transmitted to the host device 105. The term "hit" may be used to refer to the scenario where the volatile memory 120 stores data requested by the host device 105. If then sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-*a* (e.g., in response to determining that the n sets of volatile memory cells do not store the requested data) so that it can be transmitted to the host device 105. The term "miss" may be used to refer to the scenario where the volatile memory 120 does not store data requested by the host device 105.

In a miss scenario, after transferring the requested data to the buffer 135-*a*, the interface controller 115 may transfer the requested data from the buffer 135-*a* to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-*b* so that it can be transferred to the non-volatile memory 125 for storage. Such a process may be referred to as "eviction" and the data transferred from the volatile memory 120 to the buffer 135-*b* may be referred to as "victim" data. In some cases, the interface controller 115 may transfer a subset of the victim data from the buffer 135-*b* to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., when interface controller operates in one mode such as a write-back mode), dirty data may be data that is present in the volatile memory 120 but not present in the non-volatile memory 125.

In some examples, non-volatile memory 206, volatile memory 204, or both may include error detection and correction circuitry in their return data path (e.g., before transmission on data bus 232 or data bus 238-*a*, respectively), such that data that is read from such memories is checked for errors and corrected if possible before transmission to the host device. To reduce read latencies, as described herein, non-volatile memory 206, volatile memory 204, or both may include features to support bypassing the error detection and correction circuitry such that data that is read from such memories is transmitted to the host device in parallel with checking the data for errors.

Figure 2:
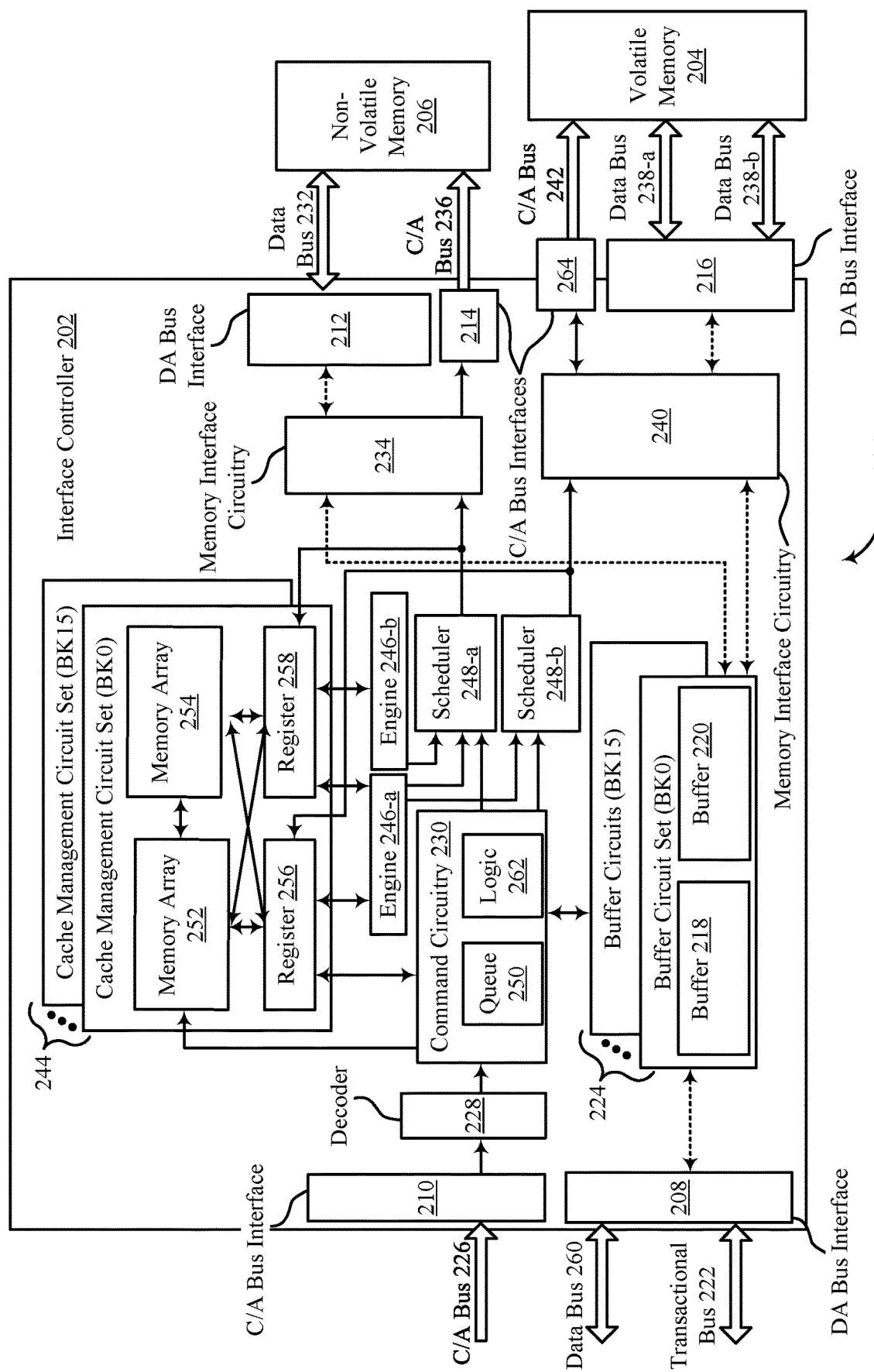
FIG. 2 illustrates an exemplary system or subsystem that supports a memory bypass for error detection and correction in accordance with examples of the present disclosure.

FIG. 2 illustrates an example of memory subsystem 200 that supports a memory bypass for error detection and correction in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor, and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the number of memory cells or column addresses in a row, or the number of column addresses accessed during an access operation. Alternatively, a page size may refer to a size of data handled by various interfaces. In some cases, different memory device types may have different page sizes. For example, a DRAM page size (e.g., 2 kB) may be a superset of a non-volatile memory (e.g., FeRAM) page size (e.g., 64B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller number of FeRAM cells may be activated when an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the number of columns or memory cells in a row. As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any number of data buses 260 and any number of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a storage command or retrieval command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-*a* and 135-*b*, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a CDRAM Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as SRAM cells.

Storage information may include content information, validity information, or dirty information (or any combination thereof) associated with the volatile memory 204. Content information (which may also be referred to as tag information or address information) may indicate which data is stored in a set of volatile memory cells. For example, the content information (e.g., a tag address) for a set of one or more volatile memory cells may indicate which set of one or more non-volatile memory cells currently has data stored in the set of one or more volatile memory cells. Validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., content and validity information) for an associated bank (e.g., BK0) of the volatile memory 204. The storage information may be stored on a per-page basis (e.g., there may be respective storage information for each page of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set of volatile memory cells when actual data is stored in that set of volatile memory cells. This bit may be referred to a validity bit or a validity flag. As with the content information, the validity information stored in the memory array 252 may be stored on a per-page basis. Thus, each validity bit may indicate the validity of data stored in an associated page in some examples.

The memory array 254 may be similar to the memory array 252 and may also include memory cells that store validity information for a bank (e.g., BK0) of the volatile memory 204 that is associated with the memory array 252. However, the validity information stored in the memory array 254 may be stored on a subblock basis as opposed to a per-page basis for the memory array 252. For example, the validity information stored in the memory cells of the memory array 254 may indicate the validity of data for subsets of volatile memory cells in a set (e.g., page) of volatile memory cells. As an example, the validity information in the memory array 254 may indicate the validity of each subset (e.g., 64B) of data in a page of data stored in BK0 of the volatile memory 204. Storing content information and validity information on a per-page basis in the memory array 252 may allow the interface controller 202 to quickly and efficiently determine whether there is a hit or miss for data in the volatile memory 204. Storing validity information on a subblock basis may allow the interface controller 202 to determine which subsets of data to preserve in the non-volatile memory 206 during an eviction process.

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information) from the memory array 252 or the scheduler 248-b or both. The cache management circuitry set may also include a second register (e.g., a register 258 which may be a victim page tag (VPT) register) configured to receive storage information from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on content information from the register 256.

The engine 246-a may be coupled with the register 256, the register 258, and the schedulers 248. The engine 246-a may be configured to receive storage information from various components and issue commands to the schedulers 248 based on the storage information. For example, when the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, when the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on commands from the command circuitry 230, the engine 246-a, the engine 246-b, or a combination of these components. Similarly, the scheduler 248-b may be coupled with various components of the interface controller 202 and may facilitate accessing the volatile memory 204 by issuing commands to the memory interface circuitry 240. The commands issued by the scheduler 248-b may be based on commands from the command circuitry 230 or the engine 246-a, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204. In either mode, the interface controller 202 may first check to see if the volatile memory 204 has memory cells available to store the data. To do so, the command circuitry 230 may reference the memory array 252 (e.g., using a set of the memory address bits) to determine whether one or more of the n sets (e.g., pages) of volatile memory cells associated with the memory address are empty (e.g., store random or invalid data). In some cases, a set of volatile memory cells in the volatile memory 204 may be referred to as a line or cache line.

If one of then associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the old data (e.g., existing data) in one of the n associated sets of volatile memory cells to the buffer 220. The dirty information for the old data may also be transferred to the memory array 254 or register 258 for identification of dirty subsets of the old data. After the old data is stored in the buffer 220, the new data can be transferred from the buffer 218 to the volatile memory 204 and the old data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-b based on dirty information transferred (e.g., from the volatile memory 204) to the memory array 254 or register 258 during the eviction process.

In another example, the interface controller 202 may receive a retrieval command from the host device. The retrieval command may be received over the C/A bus 225 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets of volatile memory cells associated with the memory address stores the requested data. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells are available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

In some examples, volatile memory 204, non-volatile memory 206, or both may include an error detection component and error correction component that are configured to detect and correct errors in data read from a memory array of the volatile memory 204 or non-volatile memory 206 before transmitting the data to the host device. In some examples, each bank of volatile memory 204 or non-volatile memory 206 may include its own error detection component and error correction component. In some examples, volatile memory 204, non-volatile memory 206, or both may include error detection and correction bypass circuitry (e.g., additional or alternative conductive paths) to enable data to be transmitted to the host device before it is processed by the error detection component and error correction component, as described with reference to FIG. 3. Such error detection and correction bypass circuitry may reduce the latency associated with read operations for volatile memory 204 and/or non-volatile memory 206.

Figure 3:
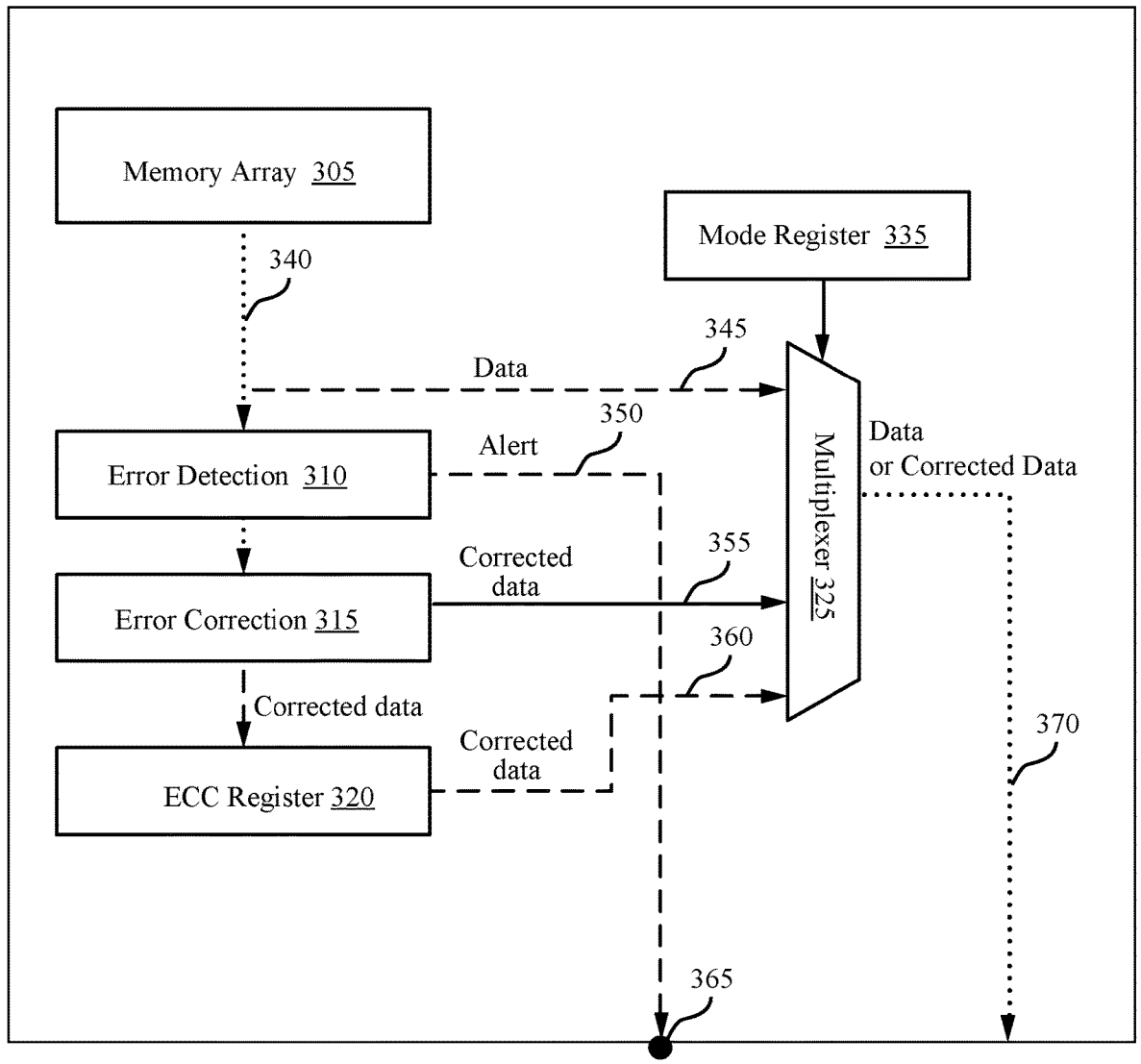
FIG. 3 illustrates an exemplary system or subsystem that supports a memory bypass for error detection and correction in accordance with examples of the present disclosure.

FIG. 3 illustrates an example of a memory subsystem 300 that supports a memory bypass for error detection and correction in accordance with examples as disclosed herein. Memory subsystem 300 may depict portions of memory subsystems 110, 200 as described with reference to FIGS. 1 and 2, respectively. Memory subsystem 300 may include memory array 305 and may be configured to read data from memory array 305 or write data to memory array 305 based on commands received from a host device. In some examples, memory array 305 may represent a portion (e.g., a bank or bank group) of volatile memory 204 or a portion of non-volatile memory 206 as described with reference to FIG. 2, for example.

The memory subsystem 300 may include error detection component 310 and error correction component 315. Error detection component 310 may be configured to perform an error detection procedure on the data to detect an error(s) in the data, and error detection component 310 may be configured to perform an error correction procedure on the data to generate corrected data. In some examples, error detection component 310 and error correction component 315 may collectively implement single-error correction, double-error detection (SECDED) functionality or another type of error detection and correction.

Error detection component 310 and error correction component 315 may be referred to collectively as error correcting code (ECC) circuitry, because they may use block codes or convolutional codes to identify and correct errors in the data. In some examples, each bank of volatile memory 204 or non-volatile memory 206 may be coupled with its own, separate ECC circuitry (e.g., each bank may be associated with separate error detection component 310 and error correction component 315). In various examples, one or more banks of volatile memory 204 or non-volatile memory 206 may be coupled with a common ECC circuitry (e.g., banks may be associated with one or more same error detection components 310 and error correction components 315). Some or all of error detection component 310 and error correction component 315 may be located within non-volatile memory 206, volatile memory 204, interface controller 202, or any combination of these, for example. In some examples, error detection component 310 and error correction component 315 may be implemented using some or all of the same circuitry or processing resources; that is, error detection component 310 and error correction component 315 may be implemented by the same logic circuitry.

Error detection component 310 and error correction component 315 may be included in a return data path associated with memory array 305 (e.g., a communication path over which data that is read from memory array 305 may be transmitted from memory array 305 to a host device). For example, error detection component 310 may be coupled with memory array 305 via conductive path 340 and may be configured to receive data that is read from memory array 305 and determine whether there is one or more errors associated with the data that is read from memory array 305; e.g., to determine whether the data is erroneous (e.g., corrupted). In some examples, conductive path 340 may be configured to transmit up to 256 bits (32 bytes) in parallel.

Such data errors may be introduced when the data is written to the memory array 305, or while the data is stored in the memory array 305, or when the data is read from the memory array 305. Such data errors may be caused by, for example, electromagnetic interference, thermal degradation, or other undesirable phenomenon. Moreover, in emerging memory systems, the introduction of new process technologies and manufacturing methods may lead to increased sensitivity to process variation, which may result in a relatively low signal-to-noise ratio and, correspondingly, a higher bit error rate.

To avoid incurring the latency associated with performing error detection and correction for every read operation before transmitting the data to the host device, memory subsystem 300 may be configured to read the data requested by the host device and transmit the data to the host device before or concurrently with performing error detection and correction. If memory subsystem 300 determines that the data is corrupted, memory subsystem may transmit an indication, which may otherwise be referred to as an alert, to the host device to notify the host device that the data it is has received (or is receiving) is corrupted.

For example, error detection component 310 may be configured to determine whether there is an error associated with reading data for the host device and generate (e.g., produce, output) an alert in response to determining that there is an error associated with the reading the data. In some examples, error detection component 310 may be configured to generate an alert by generating a voltage signal whose value indicates whether there is an error or not, such as by outputting a first voltage (e.g., an alert) to indicate an error and a second voltage to indicate that there is not an error such as by generating a voltage pulse, or one or more bits or a stream of bits, or another type of alert signal or message. Memory subsystem 300 may be configured to transmit the alert generated by error detection component 310 to the host device, such as using conductive path 350, which may be coupled between error detection component 310 and a pin 365 of memory subsystem 300. Pin 365 may be configured to be coupled with the host device. In some examples, pin 365 may be referred to as a data/mask invert (DMI) pin (e.g., a DMI pin as specified in a LPDDR5 specification), which may be defined as being used to indicate that data received from memory subsystem 300 is inverted. That is, memory subsystem 300 may re-use or share a DMI pin to transmit the alert to the host device, thereby potentially avoiding the addition of another pin for this purpose.

After determining whether there is an error associated with reading data from memory array 305, error detection component 310 may provide the data read from memory array 305 to error correction component 315. Error correction component 315 may perform an error correction procedure to correct (or attempt to correct) the data received from error detection component 310 to generate corrected data, and may store the corrected data in ECC register 320. ECC register 320 may be a 32-byte register, a 64-byte register, or another size of register. In some examples, if error detection component 310 determines that there is not an error associated with reading the data, then error correction component 315 may store the data (e.g., the data as read from memory array 305) in ECC register 320.

If error detection component 310 determines that there is an error associated with reading the data, error detection component 310 may generate an alert and memory subsystem 300 may concurrently transmit the alert and the (erroneous) data to the host device, such as by transmitting the data using conductive path 370 (which may be coupled with a data bus, such as data bus 232, 232, 238-a, or 238-b) and transmitting the alert in parallel using conductive path 350 and pin 365. Thus, the host device may receive the alert concurrently (e.g., in parallel using different communication paths, at least partially overlapping in time) with receiving the erroneous data. That is, the host device may receive the alert by the time (e.g., before or at) the time at which the host device has finished receiving the data.

In some examples, memory subsystem 300 may, after or in response to determining that there is an error associated with reading the data, proceed to attempt to correct the data using error correction component 315, and store the corrected data in ECC register 320.

The host device may, in response to receiving the alert notifying the host device that the data it has received is erroneous, transmit another read command to the memory subsystem to re-read the data from the memory array 305 (e.g., by issuing a read command that specifies the same memory address of memory array 305 as the original read command). Additionally or alternatively, the host device may transmit a different read command to the memory subsystem to read the corrected data from the ECC register 320.

In some examples, the host device or the memory subsystem 300 may determine whether to re-read the data from the memory array 305 or to read the corrected data from the ECC register 320 based on a size of the data, a size of the ECC register 320, or both.

For example, if the host device issues an initial read command that specifies reading 64 bytes of data (e.g., the size of the data is 64 bytes), the memory subsystem 300 may, in response to receiving the read command, read the data in two 32-byte portions. That is, the memory subsystem may read a first 32-byte portion of the data, perform error detection and correction on the first portion of the data, and store corrected data for the first portion of the data in the ECC register 320. The memory subsystem may then read the second 32-byte portion of the data, perform the error detection and correction on the second portion of the data, and store corrected data in the ECC register 320. If the size of the ECC register is 32 bytes, then writing the corrected data for the second portion of the data to the ECC register overwrites the corrected data for the first portion of the data. In this case, if the host device receives an alert associated with the first 32-bit portion of the data, the memory subsystem 300 cannot read the corrected data from the ECC register (because it has been overwritten by the second 32-bit portion), and instead must re-read the first portion of the data from the memory array 305.

In some examples, a host device may issue a second read command to re-read the data from the memory array or to read corrected data from the ECC register. In some examples, the second read command indicates that the location is within the memory array (e.g., by including a memory address) or that the location is within the ECC register (e.g., by using a different read opcode, or omitting a memory address, or in some other manner).

The memory subsystem 300 may, based on receiving the second read command from the host device, determine a location from which to read the data. The location may be a bank within the memory array (e.g., at the same location as the initial read command) or it may be within the ECC register (e.g., for reading corrected data from the ECC register). In some examples, the memory subsystem may read the data (or the corrected data) from the memory array or from the ECC register based on determining the location.

In some examples, memory subsystem may include a multiplexer 325 (e.g., switching circuitry or logic) to switch between transmitting data that is read from memory array 305 (which may be erroneous data) and corrected data that is read from ECC register 320. That is, memory subsystem 300 may determine whether to couple, using multiplexer 325, conductive path 345 or conductive path 360 with conductive path 370 based on whether memory subsystem 300 receives a first type of read command (e.g., a read command specifying a read operation on memory array 305) or a second type of read command (e.g., a read command specifying a read operation on ECC register 320). in some examples, conductive path 345, conductive path 360, and/or conductive path 370 may be configured to transmit up to 32 bytes of data in parallel.

In some examples, it may be desirable to selectively disable the ECC bypass path described above and perform error detection and correction on data read from memory array 305 before transmitting the data to the host device. For example, in applications where the bit error rate is high or where the memory subsystem implements ECC logic on a per-bank-group or per-channel basis, the retry bandwidth (e.g., the bandwidth required to re-read the data from the memory array 305 or ECC register 320) can impact the overall bandwidth of the system. To mitigate this effect on bandwidth, the ECC bypass path may be implemented as an optional feature that may be enabled as a configuration setting via a mode register 335. For example, the mode register 335 may be set to a first configuration setting (e.g., by the host device or by the memory subsystem 300) for enabling the ECC bypass path and a second configuration setting for disabling the ECC bypass path. In some examples, mode register 335 may be coupled with multiplexer 325 and may be used to control which data is provided to the data bus for output to the host device. If the ECC bypass is disabled, for example, the mode register 335 may cause the multiplexer to select conductive path 355 for transmitting corrected data that is output by error correction component 315 rather than selecting conductive path 345 to bypass the ECC and directly output the data before error detection and correction. In some examples, memory subsystem 300 may determine the configuration setting, and may determine whether to transmit an alert based on the configuration setting. For example, if the configuration setting indicates that the ECC bypass is disabled, the memory subsystem 300 may refrain from transmitting an alert even if the memory subsystem detects an error in the data.

The timing of various operations of memory subsystem 300 is described in more detail with reference to FIGS. 4 and 5.

Figure 4:
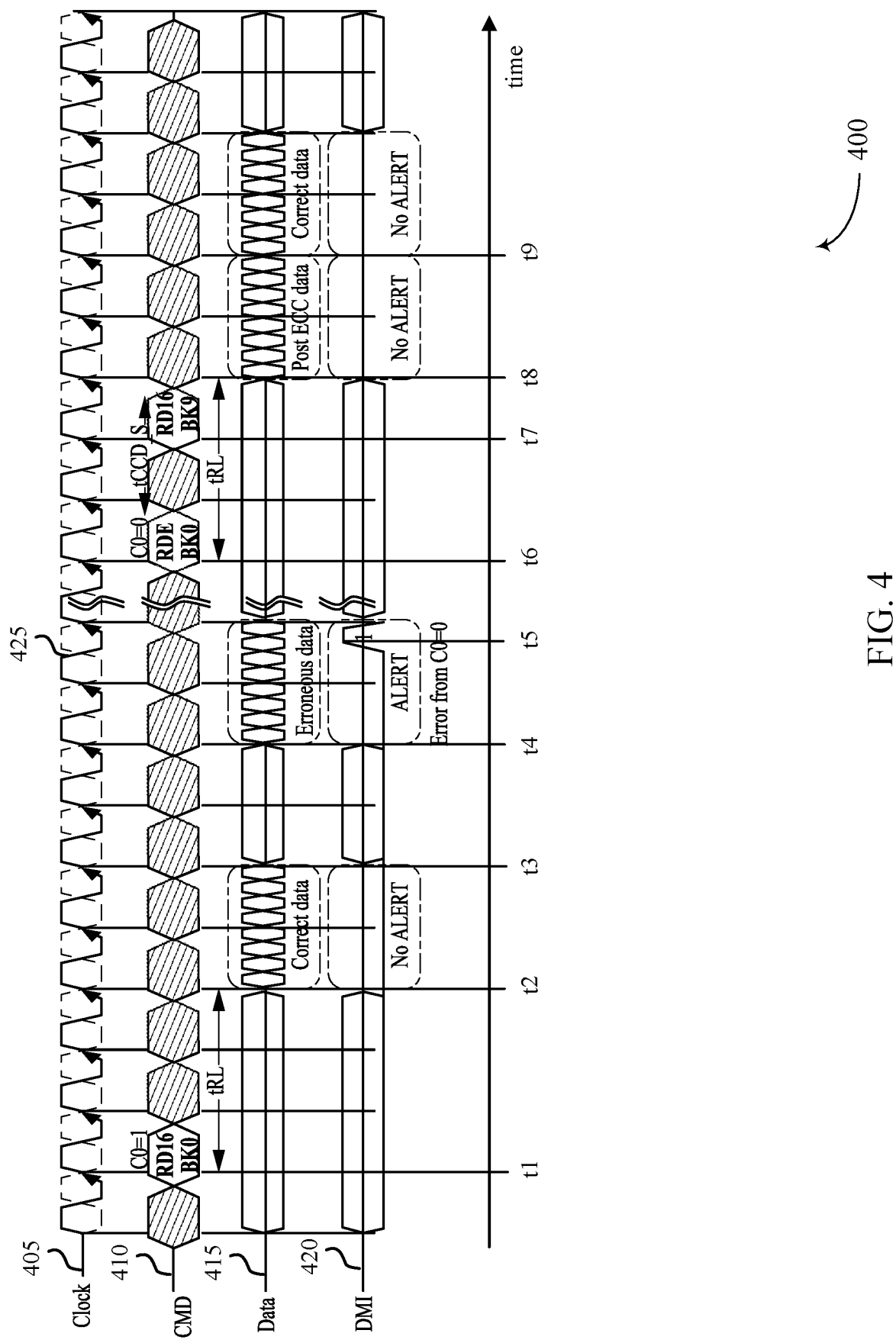
FIG. 4 illustrates an exemplary timing diagram that supports a memory bypass for error detection and correction in accordance with examples of the present disclosure.

FIG. 4 illustrates an example of a timing diagram 400 that supports a memory bypass for error detection and correction in accordance with examples as disclosed herein. Timing diagram 400 may depict timing of signals that may be generated, transmitted, or received by a memory device that includes memory subsystem 110, memory subsystem 200, and/or memory subsystem 300 during a 64-byte data read operation when an error is detected in the second 32-byte portion of the data.

Timing diagram 400 depicts the voltage or contents of various signals over time, including a clock signal 405, command signal 410, data signal 415, and data mask invert signal 420.

Clock signal 405 may be an oscillating signal that may be used by a memory device to synchronize the timing of various operations. Clock signal 405 may be generated by clock circuitry, which may include an oscillator or by another type of circuitry.

Command signal 410 may be a signal that represents or conveys a memory access command, such as a read command, received by a host device. In some cases, a command received from a host device may include a memory bank number to be accessed and a command opcode indicating the type of command (e.g., a first or second type of read command, a write command, an activate command, etc.) In some examples, command signal 410 may be received from a host device by a memory device on a command and address bus (C/A bus), such as C/A bus 226.

Data signal 415 may be a signal that represents or conveys data communicated between the memory device and the host device, such as data read from a memory bank or register of the memory device. In some cases, data signal 415 may be transmitted on a data bus of the memory device, such as data bus 232 or data bus 238a, for example. In some examples, the data bus may be a DQ bus of the memory device.

Data mask invert signal 420 may be a signal presented at a pin of memory device (e.g., a DMI pin) to indicate whether the data of data signal 415 is inverted (e.g., has an opposite polarity or order), and may also be used to indicate whether there is an error associated with reading data from the memory device. That is, data mask invert signal 420 may represent a voltage at a pin of the memory, which may in turn represent an alert generated by the memory device.

At time t1, the memory device may receive a first type of read command from a host device (RD16). The first type of read command may direct the memory device to read 64 bytes of data from bank 0 (BK0) of the memory device at an address of the memory device. The memory device may respond to receiving the first type of read command by performing two 32-byte read operations to read the requested 64 bytes of data, and may provide the two 32-bytes quantities of data to the memory controller in an order that may be specified by a value of column address bit 0, C0 (e.g., C0=1).

After reading the first 32 bytes of data, the memory device may determine (e.g., using error detection component) that there is not an error associated with reading the first 32 bytes of the requested data; that is, the first 32 bytes of data are correct (e.g., not erroneous, uncorrupted).

Between times t2 and t3 (which may occur after a read latency of tRL from receiving the first type of read command), the memory device may transmit the first 32 bytes of the requested data to the host device. Because the memory device has determined that there was not an error associated with reading the first 32 bytes of the requested data, the memory device may not generate an alert indicating an error (e.g., the memory device may refrain from generating an alert). That is, the voltage at the DMI pin between t2 and t3 may remain at a first value to indicate that there is not an error in the data.

The memory device may read the second 32-byte portion of the requested data, and may determine (e.g., using error detection component) that there is an error associated with reading the second 32-byte portion of the requested data.

Between times t4 and t5, the memory device may transmit the second 32 bytes of the requested data (e.g., the erroneous data) to the host device on a data bus (e.g., on a DQ I/O bus), and may generate an alert on the data mask invert signal 420 by changing the voltage of the data mask invert signal 420 to a second value, such as by driving a voltage pulse onto the DMI pin as an alert signal. The memory device may transmit the alert to the host device using the DMI pin concurrently with (e.g., in parallel with) transmitting the second 32 bytes of the requested data using the data bus.

In some examples, the memory device may transmit the alert and at least a portion of the data in parallel based on detecting a single rising or falling edge of the clock signal, such as falling edge 425, to synchronize transmission of the alert and the data and ensure that the alert arrives at the host device before or at the same time as all of the data is received by the host device. Thus, in some examples, the host device may receive the alert concurrently with receiving at least a portion of the second 32 bytes of data.

In response to receiving the alert, the host device may transmit, to the memory device, a second type of read command (RDE) to read the corrected data from the ECC register (e.g., ECC register 320). The second type of read command may be a command to read 32 bytes of data, and may include a second opcode that is different than the first type of read command, for example, to cause the memory device to read the corrected data from the ECC register rather than re-reading the (original) data from the bank of the memory device. In some examples, for a 32-byte read, column address bit 0 (e.g., C0) may be used to specify a column address to read (e.g., rather than specifying an order in which two 32-byte quantities of data may be returned to the memory controller, as for a 64-byte read command).

At time t6, the memory device may receive the second type of read command and may, in response to receiving the second type of read command, read the corrected data from the ECC register.

Between time t8 and t9, the memory device may transmit the corrected data to the host device (e.g., using one or more data buses, such as data bus 232, 238-a, 238-b, and/or 260). The memory device may not transmit an alert to the host device during this time period because the memory device is transmitting corrected data from the ECC register and may not perform error detection and correction on the data.

As previously discussed, the memory device may be capable of processing additional read commands that are interleaved with processing the second type of read command (RDE) to read the corrected data from the ECC register.

For example, at t7 (which may occur after a minimum column-to-column delay for accessing data from memory banks in different bank groups, tCCD_S), the memory device may receive a first type of read command (RD16) that specifies a different bank of memory (BK9) from which to read data. The memory device may read the data from the different bank of memory in response to receiving the first type of read command and may, at t9, begin to transmit the data to the host device. Assuming the error detection component determines that there is not an error associated with reading this data, the memory device may not transmit an alert associated with this data.

Figure 5:
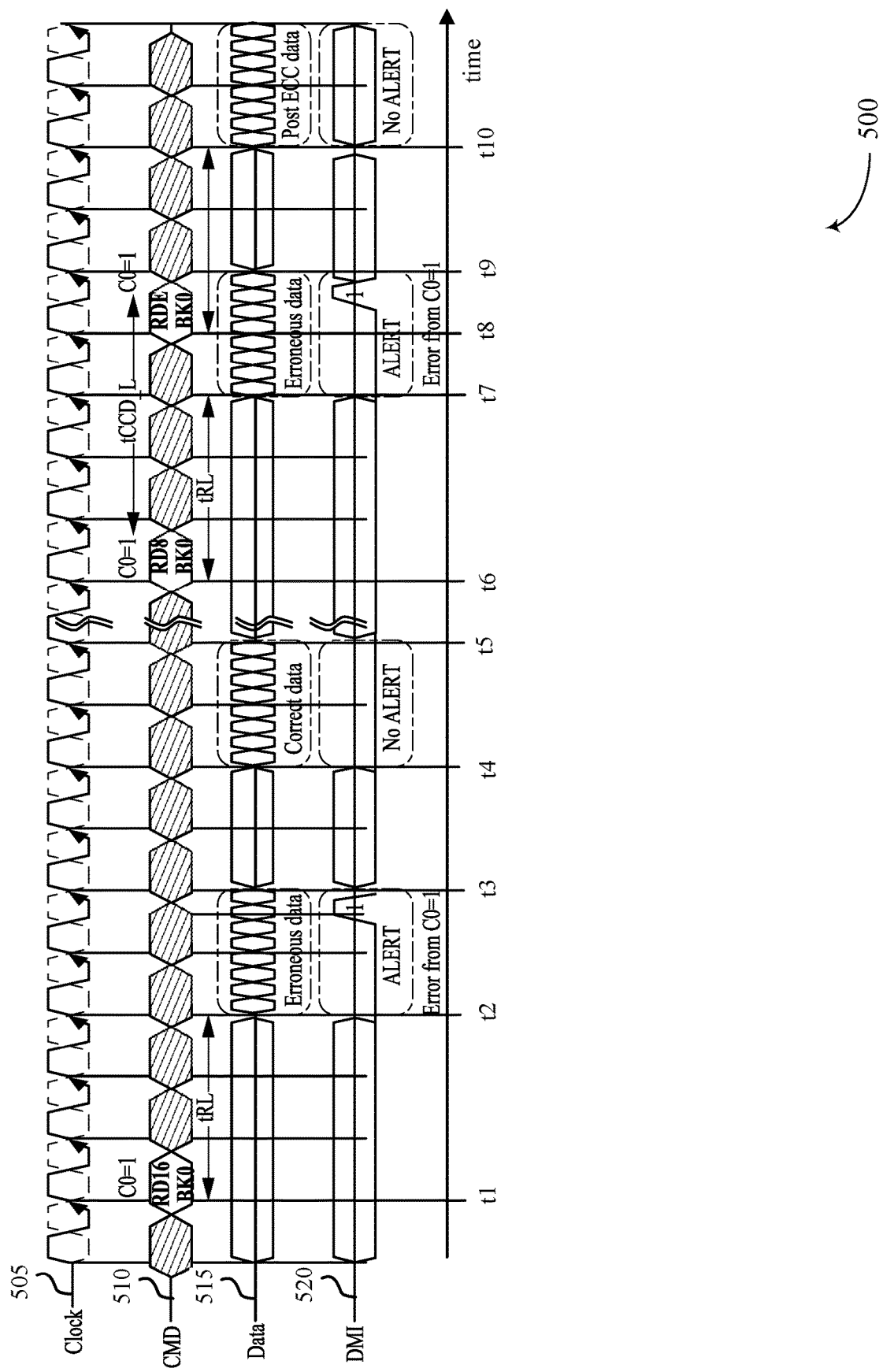
FIG. 5 illustrates an exemplary timing diagram that supports a memory bypass for error detection and correction in accordance with examples of the present disclosure.

FIG. 5 illustrates an example of a timing diagram 500 that supports a memory bypass for error detection and correction in accordance with examples as disclosed herein. Timing diagram 500 may depict the same signals described with reference to FIG. 4 in the case when an error is detected in the first 32-byte portion of data for a 64-byte read operation, rather than in the second 32-byte portion of the data as described with reference to FIG. 4. In this case, the host device may not be able to retrieve corrected data from the ECC register as shown in FIG. 4 because the second 32-byte portion of the requested data may have overwritten the contents of the ECC register.

Like timing diagram 400, timing diagram 500 depicts the voltage or contents of various signals over time, including a clock signal 505, command signal 510, data signal 515, and DMI signal 520, which may be the same or similar as the corresponding signals described with reference to FIG. 4.

At time t1, the memory device may receive a first type of read command from the host device (RD16). The first type of read command may direct the memory device to read 64 bytes of data from bank 0 (BK0) of the memory device at a specified address of the memory device. The memory device may respond to receiving the first type of read command by performing two 32-byte read operations to read the requested 64 bytes of data.

After reading the first 32 bytes of data, the memory device may determine (e.g., using an error detection component) that there is an error associated with reading the first 32 bytes of the requested data; that is, the first 32-byte portion of the data is corrupted. In response to determining that there is an error associated with reading the first 32 bytes of the requested data (e.g., the first 32 bytes are corrupted), the memory device may generate an alert indicating an error. The memory device may transmit the erroneous data to the error correction component, which may correct the data (or attempt to correct the data) and store the corrected data in an ECC register (e.g., ECC register 320).

Between times t2 and t3, the memory device may transmit the first 32 bytes of the requested data (e.g., the erroneous data) to the host device on a data bus (e.g., on a DQ I/O bus), and may generate an alert on the DMI signal 520 by changing the voltage of the DMI signal 520 to a second value, such as by driving a voltage pulse onto the DMI pin as an alert signal. The memory device may transmit the alert signal to the host device using the DMI pin concurrently with transmitting the first 32 bytes of the requested data using the data bus. Thus, in some examples, the host device may receive the alert concurrently with receiving at least a portion of the second 32 bytes of data.

The memory device may proceed to read the second 32-byte portion of the requested data, provide the second 32-byte portion of the requested data to the error detection component, and determine (e.g., using error detection component) that there is not an error associated with reading the second 32 bytes of the requested data. In response to determining that there is not an error associated with reading the second 32 bytes of the requested data, the memory device may refrain from generating an alert, such as by maintaining the DMI signal 520 (e.g., the voltage at the DMI pin) at the first value. In some examples, the memory device may also provide the second 32-byte portion of the data to the error correction component, which may store the second 32-byte portion of the data in the ECC register without changing (e.g., correcting) the data (because the data is not corrupted), thereby overwriting the corrected data for first 32-byte portion of the data.

Between times t4 and t5, the memory device may transmit the second 32 bytes of the requested data to the host device (e.g., on the DQ I/O bus).

The host device may receive the erroneous first 32 bytes of data and the alert indicating that the first 32 bytes of data is erroneous, which may cause the host device to issue one or more read commands to attempt to re-read the first 32 bytes of data. However, because the error was in the first 32 bytes of a 64-byte read, the corrected data may not be available in the ECC register. In this case, the host device may issue a first read command (RD8) to re-read the erroneous 32 bytes of data from the memory array, and a second type of read command (RDE) to read the corrected 32 bytes of data from the ECC register.

Thus, at time t5, the memory device may receive a first type of read command (RD8) from the host device, and in response, the memory device may re-read the first 32 bytes of data from bank 0 (BK0) of the memory array. Once again, the memory device may determine that there is an error associated with reading this 32 bytes of data, and may generate an alert.

Between times t7 and t9, the memory device may transmit the (erroneous) data and the alert to the host device.

At time t8 (which may occur after a minimum column-to-column delay for accessing data from memory banks in the same bank group, tCCD_L), the memory device may receive the second type of read command (RDE) to read the corrected data from the ECC register. As shown in FIG. 5, in some cases, the memory device may receive the second type of read command before completing transmission of the erroneous data and the alert; that is, the host device may issue the second type of read command before receiving the erroneous data and the alert that were transmitted in response to the first type of read command.

As previously discussed, the second type of read command (RDE) may include a second opcode that is different than the opcode of the first type of read command, for example, to cause the memory device to read the corrected data from the ECC register rather than re-reading the (original) data from the bank of the memory device.

At time t10, in response to receiving the second type of read command from the host device, the memory device may read the corrected data from the ECC register and begin transmitting the corrected data to the host device.

Figure 6:
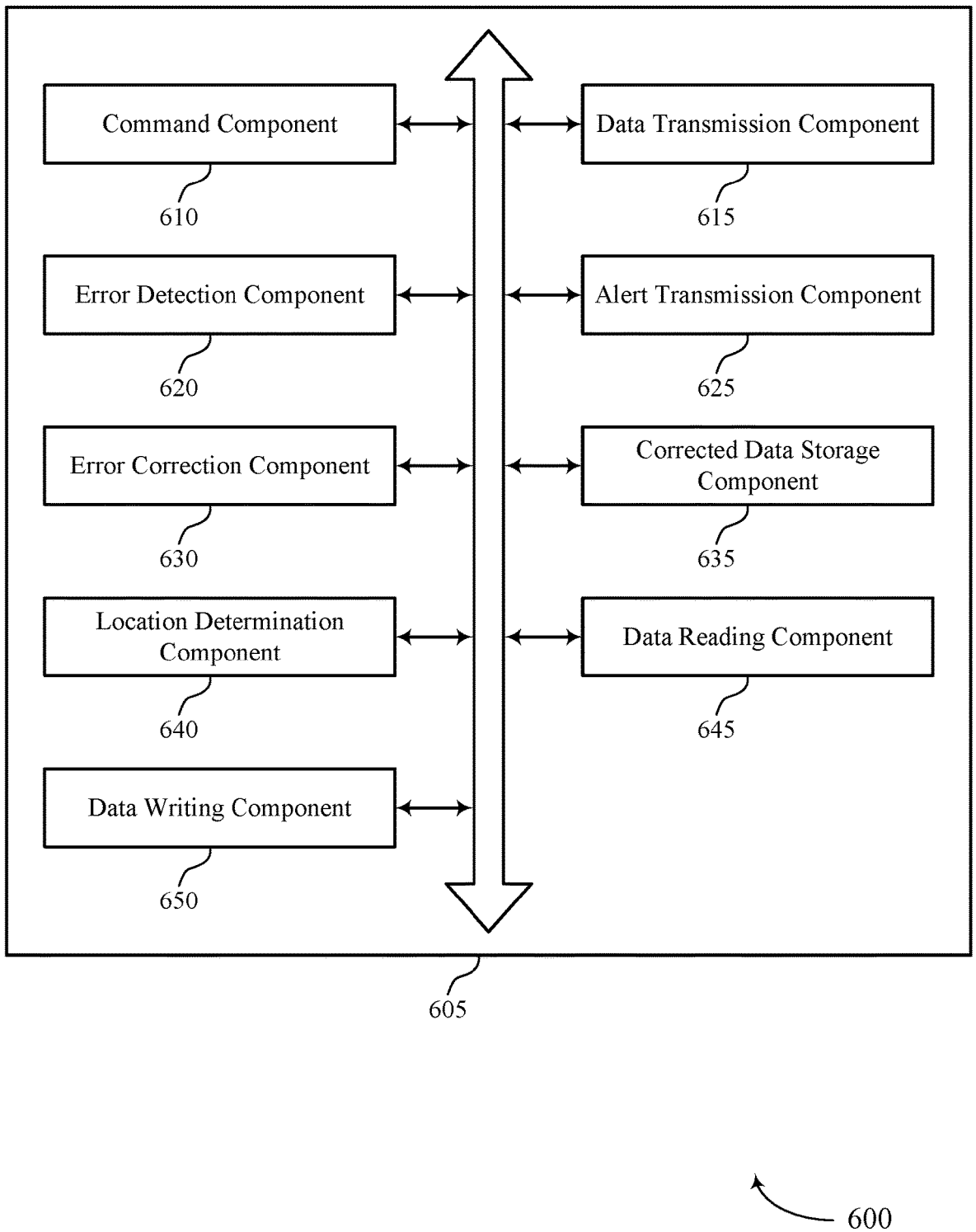
FIG. 6 shows a block diagram of a memory device that supports a memory bypass for error detection and correction in accordance with examples of the present disclosure.

FIG. 6 shows a block diagram 600 of a memory device 605 that supports a memory bypass for error detection and correction in accordance with examples as disclosed herein. The memory device 605 may be an example of aspects of a memory device or memory subsystem as described with reference to FIGS. 1 through 5. The memory device 605 may include a command component 610, a data transmission component 615, an error detection component 620, an alert transmission component 625, an error correction component 630, a corrected data storage component 635, a location determination component 640, a data reading component 645, and a data writing component 650. Each of these modules may communicate, directly or indirectly, with one another (e.g., via one or more buses).

The command component 610 may receive, from a host device, a read command associated with reading data from a memory array. In some examples, the command component 610 may receive, from the host device after transmitting the data, a second read command associated with reading the data from the memory array. In some cases, the second read command is a different command than the read command and the second read command indicates that the location is within the register. In some examples, the command component 610 may receive, from the host device before receiving the read command, a write command associated with writing first data to the memory array.

The data transmission component 615 may transmit the data to the host device based on reading the data. In some examples, the data transmission component 615 may transmit the second data to the host device. In some examples, transmitting the data to the host device includes transmitting the data to the host device on a first conductive path, and concurrently transmitting the alert to the host device includes concurrently transmitting the alert to the host device by transmitting the alert to the host device on a second conductive path.

In some examples, the data transmission component 615 may identify, before transmitting the alert to the host device, a configuration setting, where transmitting the alert to the host device is based on identifying the configuration setting.

The error detection component 620 may determine whether there is an error associated with reading the data. In some examples, the error detection component 620 may determine, based on re-reading the data from the bank of the memory array, whether there is a second error associated with the re-reading of the data.

The alert transmission component 625 may transmit, concurrently with transmitting the data to the host device, an alert to the host device based on determining that there is the error associated with reading the data. In some examples, the alert transmission component 625 may transmit, concurrently with transmitting the second data, a second alert to the host device based on determining that there is the second error associated with the re-reading of the data.

The data reading component 645 may read the data from a bank of the memory array based on the read command. In some examples, the data reading component 645 may read the second data from the location based on determining the location.

The error correction component 630 may perform, based on determining that there is the error associated with reading the data and after transmitting at least a portion of the data to the host device, an error correction procedure on the data to generate corrected data.

The corrected data storage component 635 may store the corrected data in a register.

The location determination component 640 may determine a location from which to read second data corresponding to the data based on the second read command. In some cases, the location is within the register, and reading the second data from the location includes reading the corrected data from the register. In some cases, the location is associated with the bank of the memory array, and reading the second data from the location includes reading the data from the bank of the memory array.

In some examples, the location determination component 640 may identify a size of the data based on receiving the second read command, where determining the location from which to read the data is based on the size of the data.

The data writing component 650 may write the first data to the memory array, where reading the data includes reading a representation of the first data.

Figure 7:
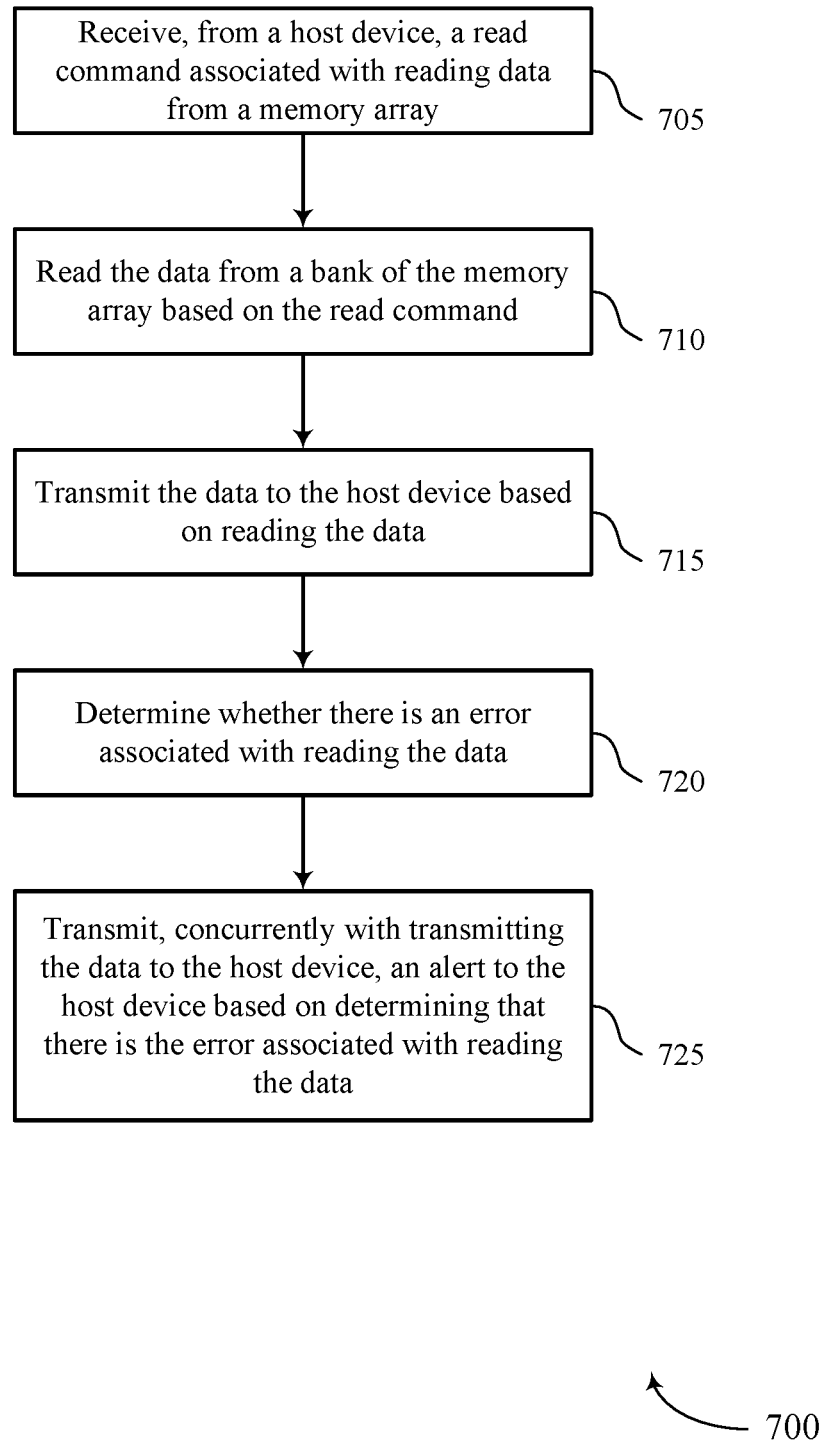
FIG. 7 shows a flowchart illustrating a method or methods that support a memory bypass for error detection and correction in accordance with examples of the present disclosure.

FIG. 7 shows a flowchart illustrating a method or methods 700 that supports memory bypass for error detection and correction in accordance with aspects of the present disclosure. The operations of method 700 may be implemented by a memory device or its components as described herein. For example, the operations of method 700 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 705, the memory device may receive, from a host device, a read command associated with reading data from a memory array. The operations of 705 may be performed according to the methods described herein. In some examples, aspects of the operations of 705 may be performed by a command component as described with reference to FIG. 6.

At 710, the memory device may read the data from a bank of the memory array based on the read command. The operations of 710 may be performed according to the methods described herein. In some examples, aspects of the operations of 710 may be performed by a data reading component as described with reference to FIG. 6.

At 715, the memory device may transmit the data to the host device based on reading the data. The operations of 715 may be performed according to the methods described herein. In some examples, aspects of the operations of 715 may be performed by a data transmission component as described with reference to FIG. 6.

At 720, the memory device may determine whether there is an error associated with reading the data. The operations of 720 may be performed according to the methods described herein. In some examples, aspects of the operations of 720 may be performed by an error detection component as described with reference to FIG. 6.

At 725, the memory device may transmit, concurrently with transmitting the data to the host device, an alert to the host device based on determining that there is the error associated with reading the data. The operations of 725 may be performed according to the methods described herein. In some examples, aspects of the operations of 725 may be performed by an alert transmission component as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving, from a host device, a read command associated with reading data from a memory array, reading the data from a bank of the memory array based on the read command, transmitting the data to the host device based on reading the data, determining whether there is an error associated with reading the data, and transmitting, concurrently with transmitting the data to the host device, an alert to the host device based on determining that there is the error associated with reading the data.

Some examples of the method 700 and the apparatus described herein may further include operations, features, means, or instructions for performing, based on determining that there may be the error associated with reading the data and after transmitting at least a portion of the data to the host device, an error correction procedure on the data to generate corrected data, and storing the corrected data in a register.

Some examples of the method 700 and the apparatus described herein may further include operations, features, means, or instructions for receiving, from the host device after transmitting the data, a second read command associated with reading the data from the memory array, determining a location from which to read second data corresponding to the data based on the second read command, reading the second data from the location based on determining the location, and transmitting the second data to the host device.

In some examples of the method 700 and the apparatus described herein, the location may be within the register, and reading the second data from the location includes reading the corrected data from the register.

In some examples of the method 700 and the apparatus described herein, the second read command may be a different command than the read command and the second read command indicates that the location may be within the register.

In some examples of the method 700 and the apparatus described herein, the location may be associated with the bank of the memory array, and reading the second data from the location includes reading the data from the bank of the memory array.

Some examples of the method 700 and the apparatus described herein may further include operations, features, means, or instructions for determining, based on re-reading the data from the bank of the memory array, whether there may be a second error associated with the re-reading of the data, and transmitting, concurrently with transmitting the second data, a second alert to the host device based on determining that there may be the second error associated with the re-reading of the data.

Some examples of the method 700 and the apparatus described herein may further include operations, features, means, or instructions for identifying a size of the data based on receiving the second read command, where determining the location from which to read the data may be based on the size of the data.

In some examples of the method 700 and the apparatus described herein, transmitting the data to the host device may include operations, features, means, or instructions for transmitting the data to the host device on a first conductive path, and where concurrently transmitting the alert to the host device.

In some examples of the method 700 and the apparatus described herein, the register may be coupled with the first conductive path.

Some examples of the method 700 and the apparatus described herein may further include operations, features, means, or instructions for identifying, before transmitting the alert to the host device, a configuration setting, where transmitting the alert to the host device may be based on identifying the configuration setting.

Some examples of the method 700 and the apparatus described herein may further include operations, features, means, or instructions for receiving, from the host device before receiving the read command, a write command associated with writing first data to the memory array, and writing the first data to the memory array, where reading the data includes reading a representation of the first data.

It should be noted that the methods described herein are possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or subregions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory array; and
   a control component coupled with the memory array and configured to cause the apparatus to:
      receive, from a host device, a read command associated with reading data from the memory array;
      read the data from a bank of the memory array based at least in part on the read command;
      transmit, to the host device concurrently with transmitting a first portion of the data to the host device and before transmitting a second portion of the data, an indication of an error status of the first portion of the data;
      determine whether there is an error in a second portion of the data; and
      transmit, after transmitting the indication of the error status and the first portion of the data and concurrently with transmitting the second portion of the data to the host device, an alert to the host device that there is the error in the second portion of the data.

2. The apparatus of claim 1, wherein the control component is further configured to cause the apparatus to:
   perform, based at least in part on determining that there is the error in the second portion of the data and after transmitting the second portion of the data to the host device, an error correction procedure on the second portion of the data to generate corrected data; and
   store the corrected data in a register.

3. The apparatus of claim 2, wherein the control component is further configured to cause the apparatus to:
   receive, from the host device after transmitting the second portion of the data, a second read command associated with reading the second portion of the data from the memory array;
   determine a location from which to read second data corresponding to the second portion of the data based at least in part on the second read command;
   read the second data from the location based at least in part on determining the location; and
   transmit the second data to the host device.

4. The apparatus of claim 3, wherein the location is associated with the bank of the memory array, and reading the second data from the location comprises reading the data from the bank of the memory array.

5. The apparatus of claim 4, wherein the control component is further configured to cause the apparatus to:
   determine, based at least in part on re-reading the second portion of the data from the bank of the memory array, whether there is a second error associated with re-reading the second portion of the data; and
   transmit, concurrently with transmitting the second data, a second alert to the host device based at least in part on determining that there is the second error associated with re-reading the second portion of the data.

6. The apparatus of claim 3, wherein the control component is further configured to cause the apparatus to:
   identify a size of the second portion of the data based at least in part on receiving the second read command, wherein determining the location from which to read the data is based at least in part on the size of the second portion of the data.

7. The apparatus of claim 2, wherein the control component is configured to cause the apparatus to transmit the second portion of the data to the host device by transmitting the second portion of the data to the host device on a first conductive path, and wherein the control component is configured to cause the apparatus to concurrently transmit the alert to the host device by transmitting the alert to the host device on a second conductive path.

8. The apparatus of claim 7, wherein the register is coupled with the first conductive path.

9. The apparatus of claim 1, wherein the control component is further configured to cause the apparatus to:
identify, before transmitting the alert to the host device, a configuration setting, wherein transmitting the alert to the host device is based at least in part on identifying the configuration setting.

10. The apparatus of claim 1, wherein the control component is further configured to cause the apparatus to:
receive, from the host device before receiving the read command, a write command associated with writing first data to the memory array; and
write the first data to the memory array, wherein reading the data comprises reading a representation of the first data.

11. An electronic device, comprising:
a memory array;
a first conductive path coupled with the memory array and configured to transmit data that is read from the memory array to a host device;
an error detection component having an input coupled with the memory array and with the first conductive path, the error detection component configured to:
receive the data that is read from the memory array,
detect whether there is an error associated with the data that is read from the memory array, and
generate an alert based on detecting that there is the error associated with the data;
an error correction component coupled with an output of the error detection component and an input of a register, the error correction component configured to correct at least one error in the data to generate corrected data and transfer the corrected data to the register; and
a second conductive path coupled with the error detection component and configured to receive the alert from the error detection component and transmit the alert to the host device in parallel with the first conductive path transmitting the data to the host device.

12. The electronic device of claim 11, wherein the register is coupled with the first conductive path for transmitting the corrected data to the host device.

13. The electronic device of claim 11, wherein the first conductive path comprises a 32-bit data bus configured to transmit at least a portion of the data to the host device.

14. The electronic device of claim 11, wherein the second conductive path is coupled with a pin of the memory array and is configured to provide the alert to the host device using the pin.

15. The electronic device of claim 14, wherein the pin comprises a data mask/invert (DMI) pin.

16. The electronic device of claim 11, further comprising:
clock circuitry configured to generate a clock signal of the memory array for synchronizing operations of the memory array, wherein the memory array is configured to transmit the data and the alert in parallel based at least in part on detecting a single edge of the clock signal.

17. The electronic device of claim 11, wherein the first conductive path is coupled with a first bank of the memory array.

18. A non-transitory computer-readable medium storing code comprising instructions, which when executed by a processor of an electronic device, cause the electronic device to:
receive, from a host device, a read command associated with reading data from a memory array of the electronic device;
read the data from a bank of the memory array based at least in part on the read command;
transmit, to the host device concurrently with transmitting a first portion of the data to the host device and before transmitting a second portion of the data, an indication of an error status of the first portion of the data;
determine whether there is an error in a second portion of the data; and
transmit, after transmitting the indication of the error status and the first portion of the data and concurrently with transmitting the second portion of the data to the host device, an alert to the host device that there is the error in the second portion of the data.

19. The non-transitory computer-readable medium of claim 18, wherein the instructions, when executed by the processor of the electronic device, further cause the electronic device to:
perform, based at least in part on determining that there is the error in the second portion of the data and after transmitting the second portion of the data to the host device, an error correction procedure on the second portion of data to generate corrected data; and
store the corrected data in a register of the memory array.

20. The non-transitory computer-readable medium of claim 19, wherein the instructions, when executed by the processor of the electronic device, further cause the electronic device to:
receive, from the host device after transmitting the second portion of the data, a second read command associated with reading the second portion of the data from the memory array;
determine a location in the memory array from which to read second data corresponding to the second portion of the data based at least in part on the second read command;
read the second data from the location based at least in part on determining the location; and
transmit the second data to the host device.

21. An apparatus, comprising:
a memory array; and
a control component coupled with the memory array and configured to cause the apparatus to:
receive, from a host device, a read command associated with reading data from the memory array;
read the data from a bank of the memory array based at least in part on the read command;
transmit the data to the host device based at least in part on reading the data;
determine whether there is an error associated with reading the data;
transmit, concurrently with transmitting the data to the host device, an alert to the host device based at least in part on determining that there is the error associated with reading the data;
perform, based at least in part on determining that there is the error associated with reading the data and after transmitting at least a portion of the data to the host device, an error correction procedure on the data to generate corrected data;
store the corrected data in a register;
receive, from the host device after transmitting the data, a second read command associated with reading the data from the memory array;

determine a location from which to read second data corresponding to the data based at least in part on the second read command, wherein the location is within the register;

read the second data from the location based at least in part on determining the location, wherein reading the second data from the location comprises reading the corrected data from the register; and transmit the second data to the host device.

22. The apparatus of claim 21, wherein the second read command is a different command than the read command and the second read command indicates that the location is within the register.

23. A non-transitory computer-readable medium storing code comprising instructions, which when executed by a processor of an electronic device, cause the electronic device to:

receive, from a host device, a read command associated with reading data from a memory array of the electronic device;

read the data from a bank of the memory array based at least in part on the read command;

transmit the data to the host device based at least in part on reading the data;

determine whether there is an error associated with reading the data;

transmit, concurrently with transmitting the data to the host device, an alert to the host device based at least in part on determining that there is the error associated with reading the data;

perform, based at least in part on determining that there is the error associated with reading the data and after transmitting at least a portion of the data to the host device, an error correction procedure on the data to generate corrected data;

store the corrected data in a register of the memory array;

receive, from the host device after transmitting the data, a second read command associated with reading the data from the memory array;

determine a location in the memory array from which to read second data corresponding to the data based at least in part on the second read command wherein the location is within the register of the memory array;

read the second data from the location based at least in part on determining the location, wherein reading the second data from the location comprises reading the corrected data from the register; and transmit the second data to the host device.

24. The non-transitory computer-readable medium of claim 23, wherein the second read command is a different command than the read command and the second read command indicates that the location is within the register of the memory array.

* * * * *